(12) United States Patent
Dudar

(10) Patent No.: US 11,970,998 B2
(45) Date of Patent: Apr. 30, 2024

(54) SYSTEMS AND METHODS FOR A FUEL VAPOR CANISTER HEATING ELEMENT

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/175,430

(22) Filed: Feb. 27, 2023

(65) Prior Publication Data
US 2023/0220819 A1    Jul. 13, 2023

Related U.S. Application Data

(63) Continuation of application No. 17/573,441, filed on Jan. 11, 2022, now Pat. No. 11,649,787.

(51) Int. Cl.
| | | |
|---|---|---|
| *F02M 25/08* | (2006.01) | |
| *B01D 53/04* | (2006.01) | |
| *F02D 41/00* | (2006.01) | |
| *F02M 31/135* | (2006.01) | |

(52) U.S. Cl.
CPC ..... *F02M 25/0809* (2013.01); *B01D 53/0438* (2013.01); *F02D 41/003* (2013.01); *F02M 25/0818* (2013.01); *F02M 25/0836* (2013.01); *F02M 25/0854* (2013.01); *F02M 31/135* (2013.01); *B01D 2253/102* (2013.01); *B01D 2257/702* (2013.01); *B01D 2259/40088* (2013.01); *B01D 2259/4516* (2013.01); *B01D 2259/4566* (2013.01); *F02M 2025/0881* (2013.01)

(58) Field of Classification Search
CPC .......... F02M 25/0809; F02M 25/0818; F02M 25/0836; F02M 25/0854; F02M 31/135; F02M 2025/0881; B01D 53/0438; B01D 2253/102; B01D 2257/702; B01D 2259/40088; B01D 2259/4516; B01D 2259/4566; F02D 41/003
See application file for complete search history.

(56) References Cited

U.S. PATENT DOCUMENTS

| | | | |
|---|---|---|---|
| 9,682,628 B2 | 6/2017 | Burleigh et al. | |
| 10,054,070 B2 | 8/2018 | Dudar et al. | |
| 10,215,132 B2* | 2/2019 | Dudar | F02M 25/0836 |
| 10,451,010 B2* | 10/2019 | Dudar | F02D 41/1454 |
| 10,982,607 B2 | 4/2021 | Dudar et al. | |
| 2012/0152210 A1* | 6/2012 | Reddy | F02M 25/089 137/15.01 |
| 2015/0120110 A1* | 4/2015 | Yang | F02D 41/0032 903/903 |
| 2017/0082038 A1* | 3/2017 | Dudar | F02D 41/0045 |
| 2017/0114732 A1* | 4/2017 | Dudar | F02M 25/0854 |

(Continued)

*Primary Examiner* — Phutthiwat Wongwian
*Assistant Examiner* — Susan E Scharpf
(74) *Attorney, Agent, or Firm* — Vincent Mastrogiacomo; McCoy Russell LLP

(57) ABSTRACT

Methods and systems are provided for diagnosing a heating element coupled to a canister of an evaporative emissions control (EVAP) system. In one example, a method (or system) may include evacuating the canister at different temperature conditions, and diagnosing the heating element based on the different times taken to evacuate the canister at the different temperature conditions.

20 Claims, 7 Drawing Sheets

(56) References Cited

U.S. PATENT DOCUMENTS

| | | | |
|---|---|---|---|
| 2017/0342919 A1* | 11/2017 | Dekar | F02D 41/021 |
| 2017/0370306 A1* | 12/2017 | Dudar | F02D 41/3005 |
| 2018/0058384 A1* | 3/2018 | Dudar | F02D 41/221 |
| 2018/0066595 A1* | 3/2018 | Dudar | F02M 25/0818 |
| 2019/0055905 A1* | 2/2019 | Dudar | F02D 41/004 |
| 2019/0101072 A1* | 4/2019 | Dudar | F02D 41/0035 |
| 2020/0102904 A1* | 4/2020 | Dudar | F02D 41/22 |

* cited by examiner

SYSTEMS AND METHODS FOR A FUEL VAPOR CANISTER HEATING ELEMENT

CROSS REFERENCE TO RELATED APPLICATION

The present application is a continuation of U.S. Non-Provisional patent application Ser. No. 17/573,441, entitled "SYSTEMS AND METHODS FOR A FUEL VAPOR CANISTER HEATING ELEMENT", and filed on Jan. 11, 2022. The entire contents of the above-listed application are hereby incorporated by reference for all purposes.

FIELD

The present description relates generally to methods and systems for diagnostics of a heating element in a fuel vapor canister of an evaporative emissions control (EVAP) system.

BACKGROUND/SUMMARY

Vehicle emission control systems may be configured to store fuel vapors from fuel tank refueling and diurnal engine operations in a fuel vapor canister containing an adsorbent, such as activated carbon. The stored vapors may then be purged from the canister during a subsequent engine operation. The purged vapors may be routed to engine intake for combustion, further improving vehicle fuel economy.

Fuel vapor adsorption by activated carbon is an exothermic reaction; the canister experiences an increase in temperature during canister loading. Conversely, fuel vapor desorption is endothermic, cooling the canister during purge events. Thus, a cool fuel vapor canister may have enhanced adsorption capacity, while a hot fuel vapor canister may have an increased ability to desorb fuel vapor. As such, heating the adsorbent is employed as a strategy to promote desorption and increase purge efficiency. Canister heating elements may directly heat the adsorbent, may heat the exterior of the canister, and/or may heat purge air passing through the canister. As part of the evaporative emissions system a canister heating element may be subject to periodic testing in order to meet emissions standards.

One example approach for diagnosing a canister heating element is provided by Dudar in U.S. Pat. No. 10,451,010. Therein, Dudar proposes a method for purging the contents of a canister following a refuel event, as part of determining the integrity of components of an emissions control (EVAP) system of an engine. Following the refuel event, the contents of the canister may be purged into an engine intake in order to desorb hydrocarbon light ends from the canister, the canister may be sealed off, heated for a period of time and then coupled to a vent line to atmosphere via opening a canister vent valve, and the hydrocarbon content of the fuel vapors stored in the vent line may be measured via a hydrocarbon sensor coupled thereto. Due to sufficient purging of the hydrocarbon light ends, coupling the canister to the atmosphere via the vent line after heating may mostly purge hydrocarbon heavy ends from the canister. If the hydrocarbon sensor responds during coupling of the canister to the atmosphere via the vent line, this may indicate that both the hydrocarbon sensor and the canister heating element are working properly. If the hydrocarbon sensor does not respond, the contents of canister may then be purged into the engine intake. If the purge is measured to be successful (e.g., by measuring the response of intake oxygen sensors or exhaust oxygen sensors indicating the air/fuel ratio to be rich responsive to the canister purge), then this may indicate that that canister heating element is working properly, but that the hydrocarbon sensor is degraded. Otherwise, it may be inferred that either the canister heating element is non-functional, or there is a fault in the EVAP system.

However, the inventors herein have recognized potential issues with such systems. As one example, the diagnostic for the hydrocarbon sensor and the canister heating element presented in U.S. Pat. No. 10,451,010 may be dependent on the measurements of one or more oxygen sensors coupled to the engine intake and/or the engine exhaust, which if defective, may completely obscure the results of the diagnostic. Further, even if the oxygen sensors are functional, if there is an undiagnosed degradation in the EVAP system, this may also obscure the results of diagnosing the canister heating element, as the purge events may not be registered properly. As another example, during coupling of the canister to the vent line to atmosphere, the hydrocarbon heavy ends may be captured via a bleed canister, in order to prevent the hydrocarbons from being emitted to atmosphere. However, if the bleed canister is already sufficiently loaded, the bleed canister may not sufficiently block the hydrocarbon heavy ends from reaching atmosphere, leading to undesirable emissions.

In one example, the issues described above may be addressed by a method for an engine, comprising diagnosing a heating element coupled to a canister of an evaporative emissions control (EVAP) system based on a time to evacuate the canister at different temperature conditions. In this way, the canister heating element may be diagnosed, without reliance on a hydrocarbon sensor, and without a chance of increased emissions during the diagnostic.

As one example, the method may include, after an engine-off event, first determining that the canister is unloaded, and that the EVAP system is free of degradations (such as via an evaporative leak check module (ELCM) degradation test diagnostic, for example). Following these entry conditions being satisfied, the method may include previewing a diurnal temperature cycle for a temperature minimum. When the temperature minimum of the diurnal temperature cycle is achieved, the canister heating element diagnostic may be initiated in a cold-temperature condition.

The diagnostic may first include venting the canister side of the ELCM via vacuum pump of the ELCM. When the air is cold, the air may also be denser, making the pump take longer to evacuate the canister side of the ELCM and achieve a vacuum state. Following a threshold level of vacuum of the ELCM being attained, the time taken to achieve the threshold vacuum level during operation of the vacuum pump may be recorded. This may be repeated multiple times (e.g., three times), in order to obtain an average time to achieve the threshold vacuum under pumping. Following the cold air diagnostic, the canister may be sealed, and the canister heating element may be activated for a calibrated period of time, in order to sufficiently heat the canister for vapor desorption. The vacuum pumping by the vacuum pump of the ELCM may be repeated, and the time taken to reach the threshold vacuum level may again be recorded two or more times. If the canister heating element is robust, the air will be heated and be less dense, and thus it may take less time for the vacuum pump to pump evacuate the canister side in order to achieve the threshold level of vacuum of the ELCM. The time taken to achieve the threshold vacuum level during cold-temperature conditions may then be compared to the time taken to achieve the threshold vacuum level during the heated conditions, in other words, after the canister heating. If the time to achieve the threshold vacuum under cold-temperature conditions is greater than the time to achieve the threshold vacuum under heated conditions, this may indicate that the canister heating element is robust (functioning properly); otherwise, the canister heating element may be indicated to be degraded, and subsequent mitigating actions may be taken.

In this way, by comparing a time to achieve a threshold level of vacuum of the ELCM in a cold-temperature condition versus in a heated condition, a simplified and effective diagnostic routine for diagnosing canister heating element degradation may be provided. The technical effect of comparing the time to achieve a threshold level of vacuum of the ELCM in a cold-temperature conditions versus in a heated condition is that further engine hardware (such as a hydrocarbon sensor, and/or a temperature sensor coupled to the fuel vapor canister) may not be required in order to diagnose the canister heating element. This may reduce expense and reduce reliance on multiple sensor measurements, which may be unreliable if said sensors are degraded. Overall, by monitoring health of a canister heating element, robustness of the entire EVAP system may be ensured.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
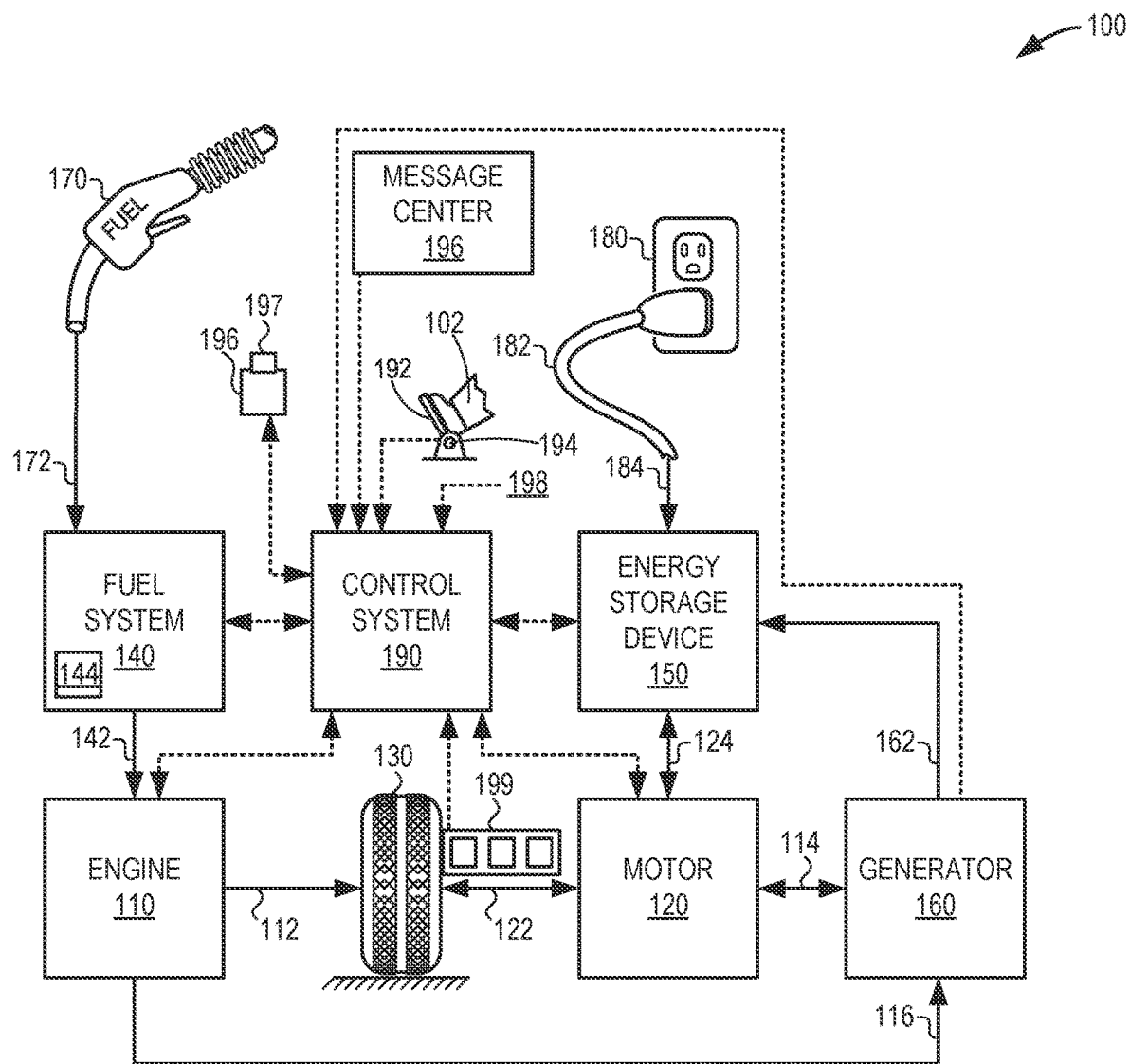
FIG. 1 shows a high-level block diagram illustrating an example vehicle system.
Figure 2:
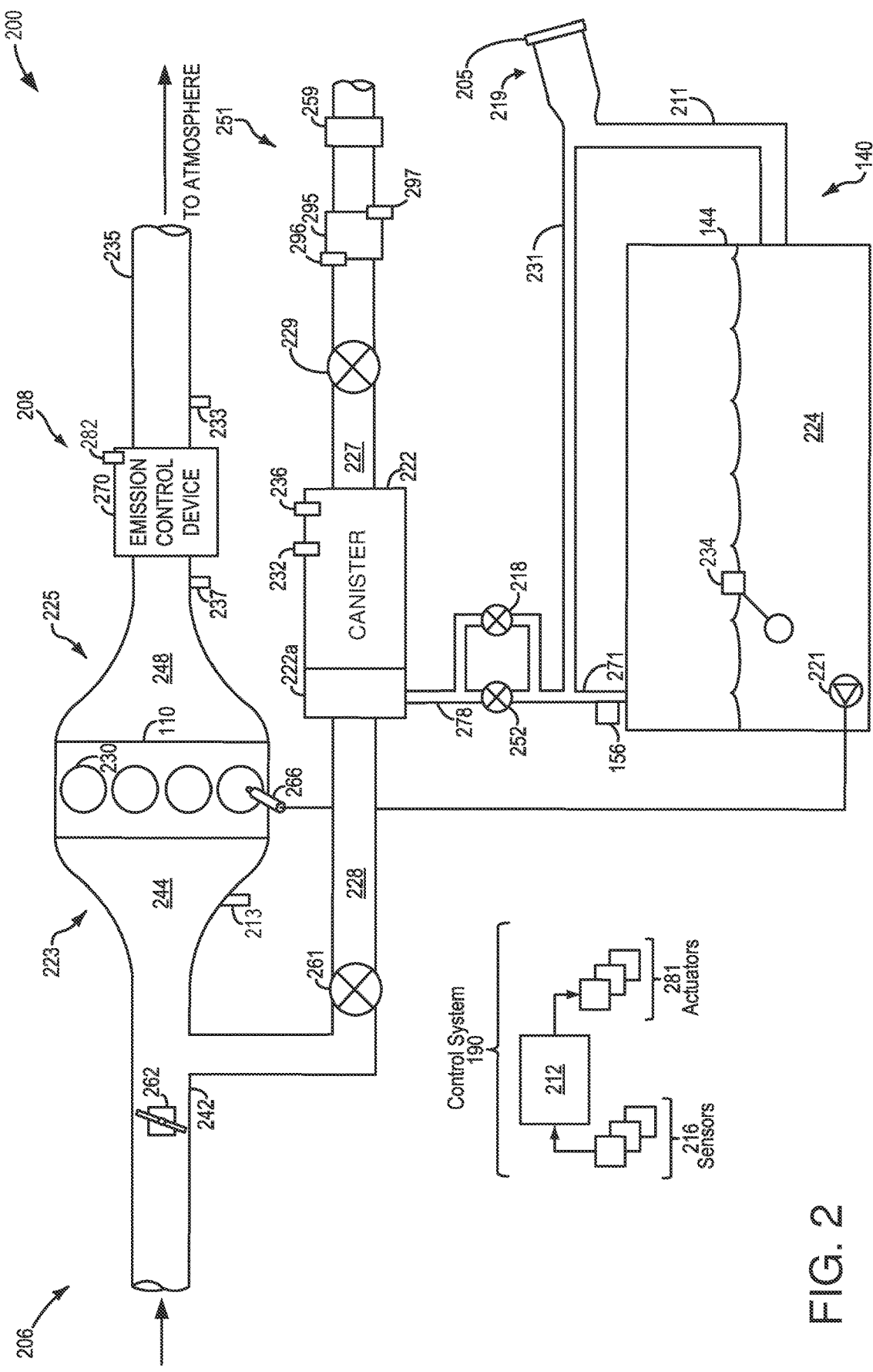
FIG. 2 shows a schematic diagram of a fuel system and an evaporative emissions control (EVAP) system including in the example vehicle system of FIG. 1.

The following description relates to systems and methods for diagnosing the integrity of a canister heating element of an evaporative emission control (EVAP) system of an engine. The engine may be included as part of a vehicle system, as illustrated in FIG. 1. The engine may include an EVAP system and a fuel system, with the fuel tank being a non-integrated refueling canister-only system (NIRCOS) fuel system, as depicted in FIG. 2. The NIRCOS fuel system may be sealed off from other sub-systems of the engine, in order to trap diurnal fuel vapors (that is, from diurnal temperature cycles) and "running loss" fuel vapors (that is, from fuel vaporized during vehicle operation). Further included within the engine, as part of the EVAP system, is an evaporative leak check module (ELCM), which may be utilized in order to detect degradations in the EVAP system. The ELCM may be configured to adapt conformations, such as the conformations shown in FIGS. 3A-3C during an EVAP system diagnostics routine. A controller, which may be configured as a power train control module (PCM), may perform a control routine for an ELCM test, such as the method depicted in FIG. 4. The method may include determining the integrity of a canister side of the fuel system first, followed by determining the integrity of the fuel tank by drawing a vacuum on the fuel tank, sealing the fuel tank, then monitoring the subsequent vacuum bleed-up. Upon confirmation that the EVAP system is free of degradations, entry condition may be met for a method for diagnosing the integrity of the canister heating element, such as the method depicted in FIGS. 5A-B. The method FIGS. 5A-B may include achieving a vacuum in the EVAP system during a canister side venting via the ELCM vacuum pump during cold-temperature conditions and during heated conditions, and comparing the time taken to achieve vacuum under the two conditions. FIG. 6 shows a timeline of an exemplary diagnostic of the fuel system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state, in other words set to a deactivated state, where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122, where the motor may convert the kinetic energy of the vehicle to electrical energy for storage at energy storage device 150 as indicated by arrow 124. This operation may be referred to as regenerative braking of the vehicle. Thus, motor 120 may provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated.

During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle, such as sealed pressure-less non-integrated refueling canister-only systems (NIRCOS) fuel tanks. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of the engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Referring now to FIG. 2, a schematic diagram 200 depicting a vehicle system 206 is shown. In some examples, vehicle system 206 may be an HEV system, such as a PHEV system. For example, vehicle system 206 may be the same as vehicle propulsion system 100 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of an evaporative emissions control (EVAP) system 251 and fuel system 140. Engine system 208 may include engine 110 having a plurality of cylinders 230. Engine 110 may include an engine air intake system 223 and an engine exhaust system 225. Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Engine exhaust system 225 may include an emission control device 270, which in one example may be mounted in a close-coupled position in exhaust passage 235 (e.g., closer to engine 110 than an outlet of exhaust passage 235) and may include one or more exhaust catalysts. For instance, emission control device 270 may include one or more of a three-way catalyst, a lean nitrogen oxide ($NO_x$) trap, a diesel particulate filter, an oxidation catalyst, etc. In some examples, an electric heater 282 may be coupled to emission control device 270, and utilized to heat emission control device 270 to or beyond a predetermined temperature (e.g., a light-off temperature of emission control device 270).

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure. Additionally, the engine system may further include an ambient temperature sensor (not shown).

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc. A pressure in the fuel system may be estimated via a fuel tank pressure transducer (FTPT) 156. In one example, the FTPT 156 may be included within the fuel tank 144.

Fuel system 140 may be a return-less fuel system, a return fuel system, or any one of various other types of fuel system. Fuel tank 144 may hold a fuel 224 including a plurality of fuel blends, e.g., fuel with a range of alcohol concentrations, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors generated in fuel system 140 may be routed to EVAP system 251 via vapor recovery line 231, before being purged to engine air intake system 223. Vapor recovery line 231 may be coupled to fuel tank 144 via one or more conduits. For example, vapor recovery line 231 may be coupled to fuel tank 144 via at least one conduit 271.

EVAP system 251 may further include one or more fuel vapor containers or canisters 222 for capturing and storing fuel vapors. Fuel vapor canister 222 may be coupled to fuel tank 144 via at least one conduit 278 including at least one fuel tank isolation valve (FTIV) 252 for isolating the fuel tank during certain conditions. For example, during engine operation, FTIV 252 may be kept closed to reduce the amount of diurnal or "running loss" vapors directed to fuel vapor canister 222 from fuel tank 144. During refueling operations and selected purging conditions, FTIV 252 may be temporarily opened, e.g., for a duration, to direct fuel vapors from the fuel tank 144 to fuel vapor canister 222. Further, FTIV 252 may also be temporarily opened when the fuel tank pressure is higher than a threshold (e.g., above a mechanical pressure limit of the fuel tank), such that fuel vapors may be released into the fuel vapor canister 222 and the fuel tank pressure is maintained below the threshold.

EVAP system 251 may further include a tank pressure control valve (TPCV) 218 configured in parallel with the FTIV 252. The TPCV 218 may be a normally closed valve, as part of the NIRCOS fuel system. The TPCV 218 may be controlled by the controller using a pulse-width modulation cycle to control any excessive pressure while the engine is running, to reduce the time for fuel tank de-pressurization prior to refueling, or even vent excessive pressure from the fuel tank when the vehicle is operating in electric vehicle mode, for example in the case of a hybrid electric vehicle.

As depicted in FIG. 2, the TPCV 218 and the FTIV 252 are illustrated as being outside of the tank, though it may be appreciated that in other examples, the TPCV 218 and FTIV 252, along with sections of the evap line (e.g., 231) may be contained wholly within the fuel tank without departing from the scope of the present disclosure.

In some examples, vapor recovery line 231 may be coupled to a fuel tank refilling or refueling system 219. In some examples, refueling system 219 may include a fuel cap 205 for sealing off the refueling system from the atmosphere. Refueling system 219 may be coupled to fuel tank 144 via a fuel filler pipe or neck 211. In some examples, fuel filler pipe 211 may include a flow meter sensor 220 operable to monitor a flow of fuel being supplied to fuel tank 144 via the fuel filler pipe (e.g., during refueling).

During refueling, fuel cap 205 may be manually opened or may be automatically opened responsive to a refueling request received at controller 212. A fuel dispensing device (e.g., 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered.

EVAP system 251 may include one or more emissions control devices, such as fuel vapor canister 222 filled with an appropriate adsorbent, the fuel vapor canister being configured to temporarily trap fuel vapors (including vaporized hydrocarbons) during refueling operations. In one example, the adsorbent used may be activated charcoal. EVAP system 251 may further include a canister ventilation path or vent line 227 which may route gases out of fuel vapor canister 222 to the atmosphere when storing, or trapping, fuel vapors from fuel system 140.

Fuel vapor canister 222 may include a buffer 222a (or buffer region), each of the fuel vapor canister and the buffer including the adsorbent. As shown, a volume of buffer 222a may be smaller than (e.g., a fraction of) a volume of fuel vapor canister 222. The adsorbent in buffer 222a may be the same as, or different from, the adsorbent in fuel vapor canister 222 (e.g., both may include charcoal). Buffer 222a may be positioned within fuel vapor canister 222 such that, during canister loading, fuel tank vapors may first be adsorbed within the buffer, and then when the buffer is saturated, further fuel tank vapors may be adsorbed in a remaining volume of the fuel vapor canister. In comparison, during purging of fuel vapor canister 222, fuel vapors may first be desorbed from the fuel vapor canister (e.g., to a threshold amount) before being desorbed from buffer 222a. In other words, loading and unloading of buffer 222a may not be linear with loading and unloading of fuel vapor canister 222. As such, one effect of buffer 222a is to dampen any fuel vapor spikes flowing from fuel tank 144 to fuel vapor canister 222, thereby reducing a possibility of any fuel vapor spikes going to engine 110.

In some examples, one or more temperature sensors 232 may be coupled to and/or within fuel vapor canister 222. As fuel vapor is adsorbed by the adsorbent in fuel vapor canister 222, heat may be generated (heat of adsorption). Likewise, as fuel vapor is desorbed by the adsorbent in fuel vapor canister 222, heat may be consumed. In this way, the adsorption and desorption of fuel vapor by fuel vapor canister 222 may be monitored and estimated based on temperature changes within the fuel vapor canister. Further, one or more canister heating elements 236 may be coupled to and/or within the fuel vapor canister 222. Canister heating element 236 may be used to selectively heat the canister (and the adsorbent contained within) for example, to increase desorption of fuel vapors prior to performing a purge operation. Canister heating element 236 may comprise an electric heating element, such as a conductive metal, ceramic, or carbon element that may be heated electrically, such as a thermistor. In some embodiments, canister heating element 236 may comprise a source of microwave energy, or may comprise a canister jacket coupled to a source of hot air or hot water. Canister heating element 236 may be coupled to one or more heat exchangers that may facilitate the transfer of heat, (e.g., from hot exhaust) to the fuel vapor canister 222. Canister heating element 236 may be configured to heat air within the fuel vapor canister 222, and/or to directly heat the adsorbent located within fuel vapor canister 222. In some embodiments, canister heating element 236 may be included in a heater compartment coupled to the interior or exterior of the fuel vapor canister 222. In some embodiments, the fuel vapor canister 222 may be coupled to one or more cooling circuits, and/or cooling fans. In this way, the fuel vapor canister 222 may be selectively cooled to increase adsorption of fuel vapors (e.g., prior to a refueling event). In some examples, canister heating element 236 may comprise one or more Peltier elements, which may be configured to selectively heat or cool the fuel vapor canister 222.

Vent line 227 may also allow fresh air to be drawn into fuel vapor canister 222 when purging stored fuel vapors from fuel system 140 to engine air intake system 223 via purge line 228 and canister purge valve 261. For example, canister purge valve 261 may be a normally closed valve, but may be opened during certain conditions so that vacuum from engine intake manifold 244 may be provided to fuel vapor canister 222 for purging. In some examples, vent line 227 may further include an air filter 259 disposed therein downstream of fuel vapor canister 222.

Flow of air and vapors between fuel vapor canister 222 and the atmosphere may be regulated by a canister vent valve 229. Canister vent valve 229 may be a normally open valve, so that FTIV 252 may control venting of fuel tank 144 with the atmosphere. As described above, FTIV 252 may be positioned between fuel tank 144 and fuel vapor canister 222 within conduit 278. In a NIRCOS fuel system, the FTIV 252 may be a normally closed valve, that when opened during conditions such as refueling, allows for venting of fuel vapors from fuel tank 144 to fuel vapor canister 222. FTIV 252 may also be opened upon the pressure in the fuel tank 144 increasing to a threshold pressure. Fuel vapors may then be vented to atmosphere via canister vent valve 229, or purged to engine air intake system 223 via canister purge valve 261.

In some examples, EVAP system 251 may further include an evaporative level check monitor (ELCM) 295. ELCM 295 may be disposed in vent line 227, between canister vent valve 229 and air filter 259, and may be configured to control venting and/or assist in detection of undesired evaporative emissions. As an example, ELCM 295 may include a vacuum pump for applying negative pressure to the fuel system when administering a test for undesired evaporative emissions. In some embodiments, the vacuum pump may be configured to be reversible. In other words, the vacuum pump may be configured to apply either a negative pressure or a positive pressure on the EVAP system 251 and fuel system 140. ELCM 295 may further include a reference orifice (not shown), a pressure sensor 297, and a changeover valve (COV) 296. A reference check may thus be performed whereby a vacuum may be drawn across the reference orifice, where the resulting vacuum level comprises a vacuum level indicative of an absence of undesired evaporative emissions. For example, following the reference check, the fuel system 140 and EVAP system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

During select engine and/or vehicle operating conditions, such as after an emission control device light-off temperature has been attained (e.g., a threshold temperature reached after warming up from ambient temperature) and with the engine running, the controller 212 may control the COV 296 to enable fuel vapor canister 222 to be fluidically coupled to atmosphere. For example, COV 296 may be configured in a first position (e.g. opened), where the first position includes the fuel vapor canister 222 fluidically coupled to atmosphere, except during pressure tests performed on the system. In one example, under natural aspiration conditions (e.g. intake manifold vacuum conditions), COV 296 may be configured in a second position (e.g. closed) to seal the fuel vapor canister 222 from atmosphere. By commanding COV 296 to the second position, the EVAP system 251 and fuel system 140 may be evacuated in order to ascertain the presence or absence of undesired evaporative emissions.

Figure 3A:
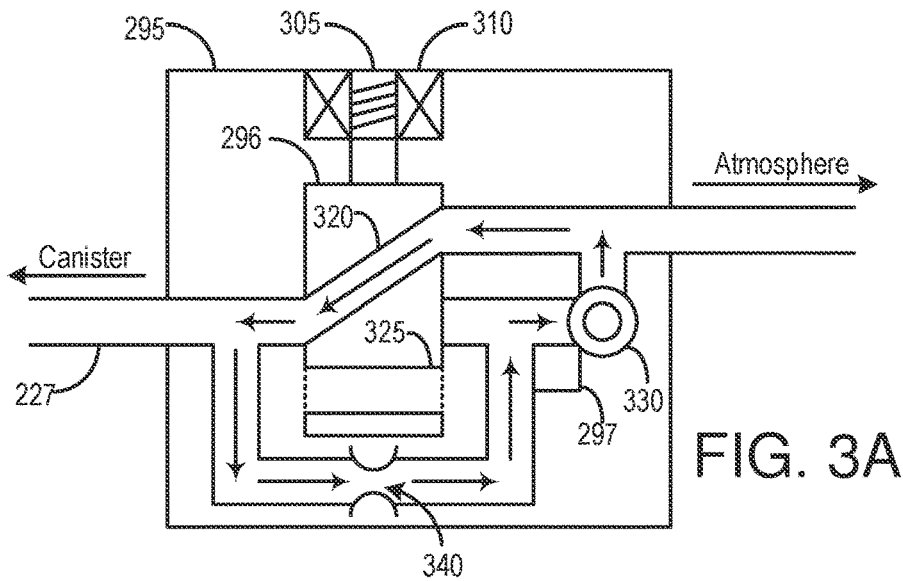
FIG. 3A shows a schematic depiction of an evaporative leak check module (ELCM) in a configuration to perform a reference check.
Figure 3B:
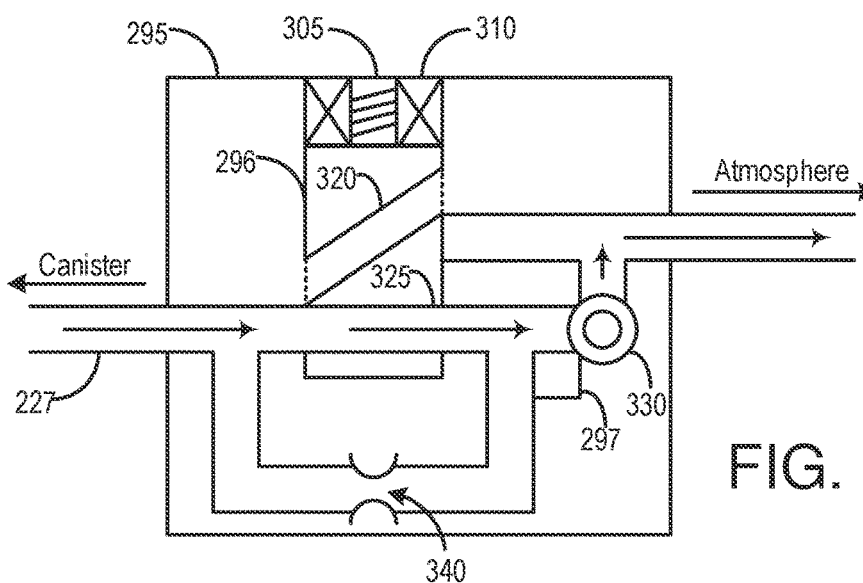
FIG. 3B shows a schematic depiction of an ELCM in a configuration to perform a tank evacuation degradation check.
Figure 3C:
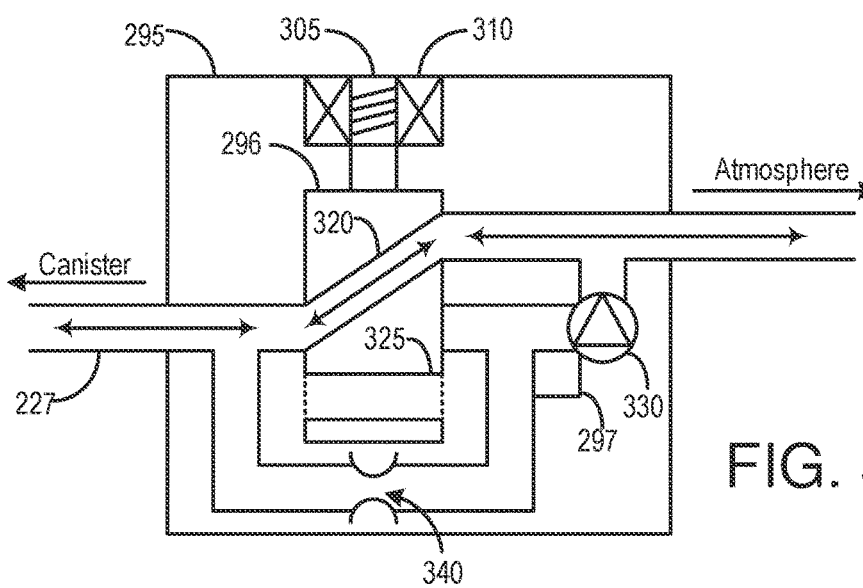
FIG. 3C shows a schematic depiction of an ELCM in a configuration to perform a purge operation.

Undesired evaporative emission detection routines may be intermittently performed by controller 212 on fuel system 140 to confirm that the fuel system is not degraded. As such, undesired evaporative emission detection routines may be performed while the engine is off (engine-off degradation test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by the ELCM 295 communicatively coupled to controller 212. ELCM 295 may further include a reference orifice. Following the application of vacuum to the fuel system, a change in pressure at the reference orifice (e.g., an absolute change or a rate of change) may be monitored via the pressure sensor 297, and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation. Example positions of the ELCM pump are shown in FIGS. 3A-C.

Fuel system 140 may be a non-integrated refueling canister-only system (NIRCOS), in that fuel tank 144 may be substantially isolatable from fuel vapor canister 222 such that fuel vapors in fuel tank 144 and fuel vapor canister 222 may be independently controlled as desired (e.g., during refueling). During periods in which fuel tank 144 is fluidically decoupled from fuel vapor canister 222, a fuel vapor pressure may develop within the fuel tank. Accordingly, venting and depressurization control routines are often implemented for NIRCOS fuel tanks, along with structural reinforcement thereof. For example, a given NIRCOS may include numerous valves and venting lines coupled to fuel tank(s) included therein to ensure that any excess fuel vapor pressure is properly evacuated or redistributed. Further, NIRCOS fuel tanks may be constructed of high tensile-strength material, such as heavy steel, and configured with a plurality of standoffs therein, the plurality of standoffs extending between opposing walls of a given NIRCOS fuel tank, such that greater fuel vapor pressures may be withstood without fuel tank degradation.

Fuel system 140 may be operated by controller 212 in a plurality of modes by selective adjustment of the various valves (e.g., responsive to the various sensors). For example, fuel system 140 may be operated in a refueling mode (e.g., when refueling is requested by a vehicle operator), wherein controller 212 may close FTIV 252. Additionally, fuel system 140 may be operated in a venting mode. In the venting mode, controller 212 may open FTIV 252 and canister vent valve 229, while maintaining canister purge valve 261 closed, to direct refueling vapors into fuel vapor canister 222 while preventing fuel vapors from being directed into engine intake manifold 244 (and thus provide a venting path for fuel vapors). As such, opening FTIV 252 may allow refueling vapors to be stored in fuel vapor canister 222. After refueling is completed, at least FTIV 252 may be closed once again.

As another example, the fuel system may be operated in a canister purging mode (e.g., after a given emission control device light-off temperature has been attained and with engine 110 running), wherein controller 212 may open canister purge valve 261 and canister vent valve 229 while closing FTIV 252. Herein, the vacuum generated by engine intake manifold 244 of (operating) engine 110 may be used to draw fresh air through vent line 227 and through fuel vapor canister 222 to purge stored fuel vapors into engine intake manifold 244. As such, in the canister purging mode, the purged fuel vapors from fuel vapor canister 222 may be combusted in engine 110. The canister purging mode may be continued until an amount or level of stored fuel vapors in fuel vapor canister 222 are below a threshold amount or level.

Control system 190, including controller 212, is shown receiving information from a plurality of sensors 216 (various examples of which are described herein) and sending control signals to a plurality of actuators 281 (various examples of which are described herein). Controller 212 may be configured as a powertrain control module (PCM). As one example, sensors 216 may include one or more of exhaust gas sensor 237 located upstream of emission control device 270 in exhaust passage 235, temperature sensor 233 located downstream of emission control device 270 in exhaust passage 235, flow meter sensor 220 located in fuel filler pipe 211, fuel level sensor 234 located in fuel tank 144, temperature sensor 232 located in fuel vapor canister 222, FTPT 156, and ELCM pressure sensor 297. Other sensors such as pressure, temperature, air/fuel ratio, and composition sensors may be coupled to various locations in vehicle system 206. As an additional or alternative example, actuators 281 may include fuel injector 266, throttle 262, FTIV 252, canister purge valve 261, canister vent valve 229, first valve 286 and second valve 288 of the fuel system, and COV 296. Controller 212 may receive input data from sensors 216, process the input data, and trigger actuators 281 in response to the processed input data based on instructions or code programmed in non-transitory memory therein, the instructions or code corresponding to one or more control routines.

FIGS. 3A-3C show a schematic depiction of an example ELCM 295 in various conditions in accordance with the present disclosure. As shown in FIG. 2, ELCM 295 may be located along vent line 227, between canister vent valve 229 and air filter 259. ELCM 295 includes a changeover valve (COV) 296, a vacuum pump 330, and a pressure sensor 297. Pump 330 may be a vane pump. COV 296 may be moveable between a first a second position. In the first position, as shown in FIGS. 3A and 3C, air may flow through ELCM 295 via first flow path 320. In the second position, as shown in FIG. 3B, air may flow through ELCM 295 via second flow path 325. The position of COV 296 may be controlled by solenoid 310 via compression spring 305. ELCM may also comprise reference orifice 340. Reference orifice 340 may have a diameter corresponding to the size of a threshold degradation to be tested, for example, 0.02". In either the first or second position, pressure sensor 297 may generate a pressure signal reflecting the pressure within ELCM 295. Operation of pump 330 and solenoid 310 may be controlled via signals received from controller 212, which may be configured as a powertrain control module (PCM).

As shown in FIG. 3A, COV 296 is in the first position, and pump 330 is activated. Canister vent valve 229 is closed, isolating ELCM 295 from the canister and fuel tank. Air flow through ELCM 295 in this configuration is represented by arrows. In this configuration, pump 330 may draw a vacuum on reference orifice 340, and pressure sensor 297 may record the vacuum level within ELCM 295. This reference check vacuum level reading may then become the threshold for passing/failing a subsequent degradation test.

As shown in FIG. 3B, COV 296 is in the second position, and pump 330 is activated. Canister vent valve 229 is open, allowing pump 330 to draw a vacuum on fuel system 140. Air flow through ELCM 295 in this configuration is represented by arrows. In this configuration, as pump 330 pulls a vacuum on fuel system 140, the absence of a degradation in the system may allow for the vacuum level in ELCM 295 to reach or exceed the previously determined vacuum threshold. In the presence of a degradation larger than the reference orifice, the pump will not pull down to the reference check vacuum level.

As shown in FIG. 3C, COV 296 is in the first position, and pump 330 is de-activated. Canister vent valve 229 is open, allowing for air to freely flow between atmosphere and the canister. During normal engine operation, the ELCM may be in this configuration in order to vent to atmosphere through the COV 296. In particular, this configuration of the ELCM 295 may allow for purging during engine operation, as well as during a refueling event.

The ELCM 295 may be used in one or more of the configurations depicted in FIGS. 3A-C in order to diagnose the functioning of one or more components of an EVAP system (e.g., 251 of FIG. 2). In one example, the ELCM 295 may be used to diagnose a canister heating element (e.g., 236 of FIG. 2) coupled to a fuel vapor canister (e.g., 222 of FIG. 2), based on a time to evacuate the canister via the pump 330 at two different temperature conditions, comprised of a first temperature and a second temperature. Following an engine-off event, and upon confirmation of an absence of degradation of the EVAP system and a lower than threshold fuel vapor load in the canister, a diagnostic for the canister heating element may begin by monitoring an ambient temperature for a temperature minimum of a diurnal temperature cycle (which may be the first temperature) via an ambient temperature sensor. Upon the ambient temperature reaching first temperature, the PCM 212 may be switched on, each of a fuel tank isolation valve (FTIV) (e.g., 252 of FIG. 2), a tank pressure control valve (TPCV) (e.g., 218 of FIG. 2) may be maintained closed, the COV 296 may be actuated from the first position to the second position, and the pump 330 may be switched on, thereby pulling air from the canister due to the vacuum generated within the ELCM via the pump. The evacuation of the canister may be continued until the pressure in the ELCM reaches a target vacuum level of the ELCM, as determined by e.g., a vacuum reference check via reference orifice 340 (as in FIG. 3A). Upon the pressure in the ELCM reaching the target vacuum level, the pump 330 may be switched off, the COV 296 may be actuated from the second position to the first position, and a first time taken to reach the target vacuum level at the first temperature may be stored in the non-transitory memory of the PCM 212.

Following recording of the time taken to reach the target vacuum level at the first temperature, the canister heating element may then be switched on for a threshold duration. Upon the threshold duration elapsing, the COV 296 may be actuated from the first position to the second position, and the pump 330 may be switched on, in order to evacuate the canister at the second temperature. Following the pressure in the ELCM 295 reaching the target vacuum level, the pump 330 may be switched off, the COV 296 may be actuated from the second position to the first position, and a second time taken to reach the target vacuum level at the second temperature may be stored in the non-transitory memory of the PCM 212. The first time may then be compared to the second time, in order to diagnose the functionality of the canister heating element. As it should be much easier for the pump 330 to generate the target vacuum level in the ELCM 295 when the pumped air from the canister is heated and less dense (e.g., during the second temperature) than when the air is colder and denser (e.g., during the first temperature), the canister heating element may be indicated to be not degraded in response to the second time being less than the first time. Otherwise, it may be inferred that the canister heating element is degraded, and actions to mitigate the defunct operation of the canister heating element may be initiated by the PCM 212, until subsequent repair or replacement of the canister heating element.

In this way, the components described in FIGS. 1-3C enable a system for a vehicle, including the PCM 212 storing instructions in non-transitory memory that, when executed, may cause the PCM to: at a minimum diurnal temperature, upon conditions being met for diagnostics of the canister heating element coupled to the canister of the EVAP system, record a first time taken to evacuate the canister, activate the canister heating element to heat the canister, record a second time taken to evacuate the heated canister, and indicate the heating element to be degraded in response to the first time being substantially equal to the second time. Further details regarding the canister heating element diagnostic are described in relation to FIGS. 5A-B.

Figure 4:
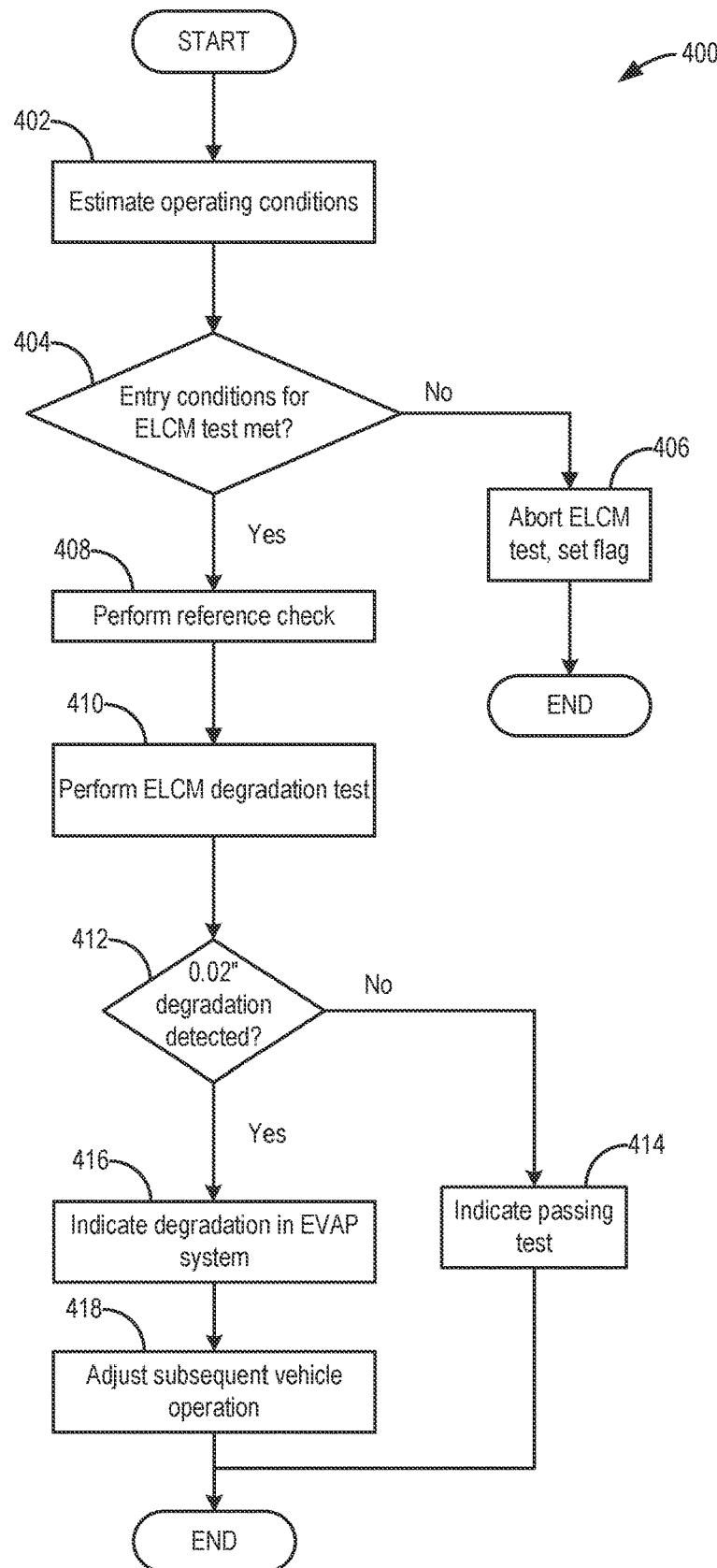
FIG. 4 shows a high level flow chart for a method that may be implemented for performing an EVAP system degradation test via an ELCM.

FIG. 4 shows a high-level flow chart for an example method 400 for performing a diagnostics routine of the EVAP system. The diagnostics routine may include an ELCM test, whereby a pressure generated in an ELCM (e.g., 295 of FIGS. 2, 3A-C) due to a canister pulldown via a vacuum pump (e.g., 330 of FIGS. 3A-C) may be compared to a reference level of vacuum in a reference orifice (e.g., 340 of FIGS. 3A-C) of the ELCM, in order to determine the presence or absence of a degradation in the EVAP system. Method 400 will be described with relation to the systems depicted in FIGS. 1-3, but it should be understood that similar methods may be used with other systems without departing from the scope of this disclosure. Method 400 may be carried out by controller 212.

Method 400 may begin at 402 by estimating operating conditions. Operating conditions may include ambient conditions, such as temperature, humidity, and barometric pressure, as well as vehicle conditions, such as engine operating status, fuel level. Continuing at 404, method 400 includes determining whether the entry conditions for an ELCM test are met. Entry conditions for an ELCM test may include an engine-off status, and/or determining that the fuel system is not undergoing a purge operation. If entry conditions are not met, method 400 may proceed to 406. At 406, method 400 includes recording that an ELCM test was aborted, and may further include setting a flag to retry the ELCM test at a later time point.

If entry conditions for an ELCM test are met, method 400 may proceed to 408. At 408, method 400 includes performing an ELCM reference check. As discussed herein with regards to FIG. 3A, an ELCM reference check may comprise closing (or maintaining closed) a canister vent valve, placing a COV in a first position, and activating an ELCM vacuum pump. A pressure sensor, such as pressure sensor 297 may record the resulting vacuum level in the ELCM, after a certain amount of time, or when the vacuum level has reached a plateau. The recorded vacuum level at the end of the reference check may be used as a vacuum threshold to signify the expected vacuum attainable for a systemic degradation with a diameter equivalent to the reference orifice. In this example embodiment, the reference orifice has a diameter of 0.02", but may be smaller or greater in diameter in other embodiments.

Continuing at 410, method 400 includes performing an ELCM degradation test. The ELCM degradation test may comprise maintaining closed a FTIV (as the FTIV may be normally closed in a NIRCOS fuel system), maintaining closed a tank pressure control valve (TPCV) (such as TPCV 218 of FIG. 2) (as the TPCV may be normally closed in a NIRCOS fuel system), closing (or maintaining closed) a canister purge valve, opening a canister vent valve, placing COV 296 in the second position and activating pump 330. In this configuration, as pump 330 pulls a vacuum on the canister side of fuel system 140, the absence of a degradation in the system may allow for the vacuum level in ELCM 295 to reach or exceed the previously determined vacuum threshold. In the presence of a degradation larger than the reference orifice, the pump will not pull down to the reference check vacuum level. The pull down may be executed until the reference vacuum is met, for a time period that is predetermined, or for a time period based on current conditions. Following the canister side test, method 400 may include de-activating pump 330, de-energizing solenoid 310, and may further include closing the vent valve.

Continuing at 412, method 400 includes determining whether the test vacuum acquired during the ELCM test is greater than or equal to the vacuum threshold for a 0.02" degradation. If a degradation is detected (e.g. the test vacuum does not reach the vacuum threshold during the allotted time period), method 400 may proceed to 416. At 416, method 400 includes indicating a degradation in the EVAP system. Indicating a degradation of the EVAP system may include recording the occurrence of a failing test result, and may further include notifying the vehicle operator of the degraded EVAP system via a DTC.

Following recording the occurrence of a failing leak test result, at 418, method 400 may include adjusting subsequent vehicle operation, in order to mitigate the effects of the degraded EVAP system, until the EVAP system is serviced. In one example, a purge schedule of the EVAP system may be updated (such as frequency of purging increased) to reduce the possibility of increased emissions from the EVAP system. In other examples, such as if the vehicle is capable of being propelled solely by power generated from an electric motor, the vehicle may be operated in an electric drive mode, where the electric motor may propel drive wheels of the vehicle so that the fueling system is not relied upon to power the engine. The method may then end.

If no degradation greater than or equal to 0.02" is detected on the canister side, method 400 may proceed to 414. At 414, method 400 includes indicating a passing test. Indicating a passing test may include recording the occurrence of a passing test result. Method 400 may then end.

Figure 5A:
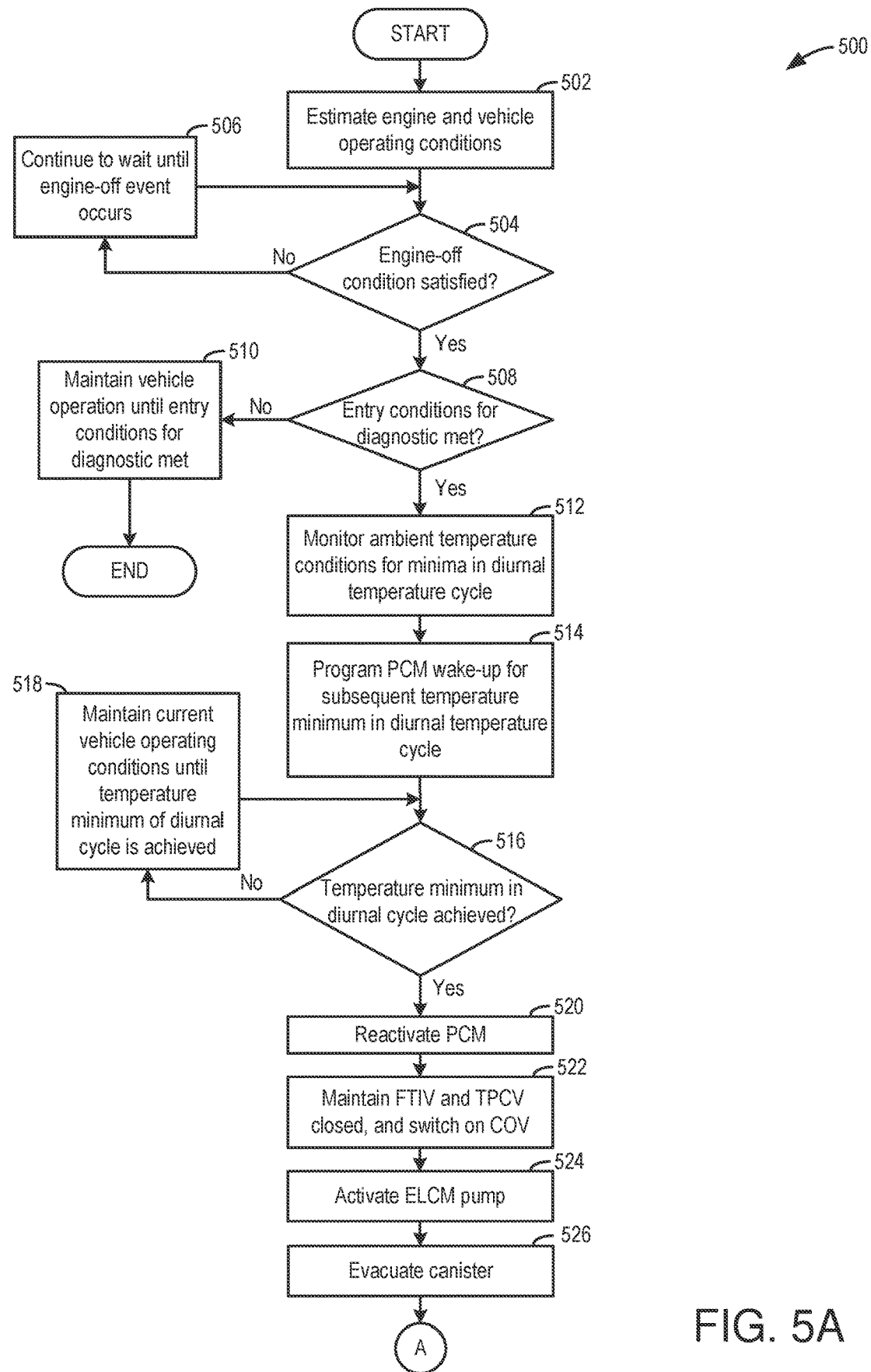
FIG. 5A shows a first part a high level flow chart for a method for diagnosing the integrity of a canister heating element of an EVAP system.
Figure 5B:
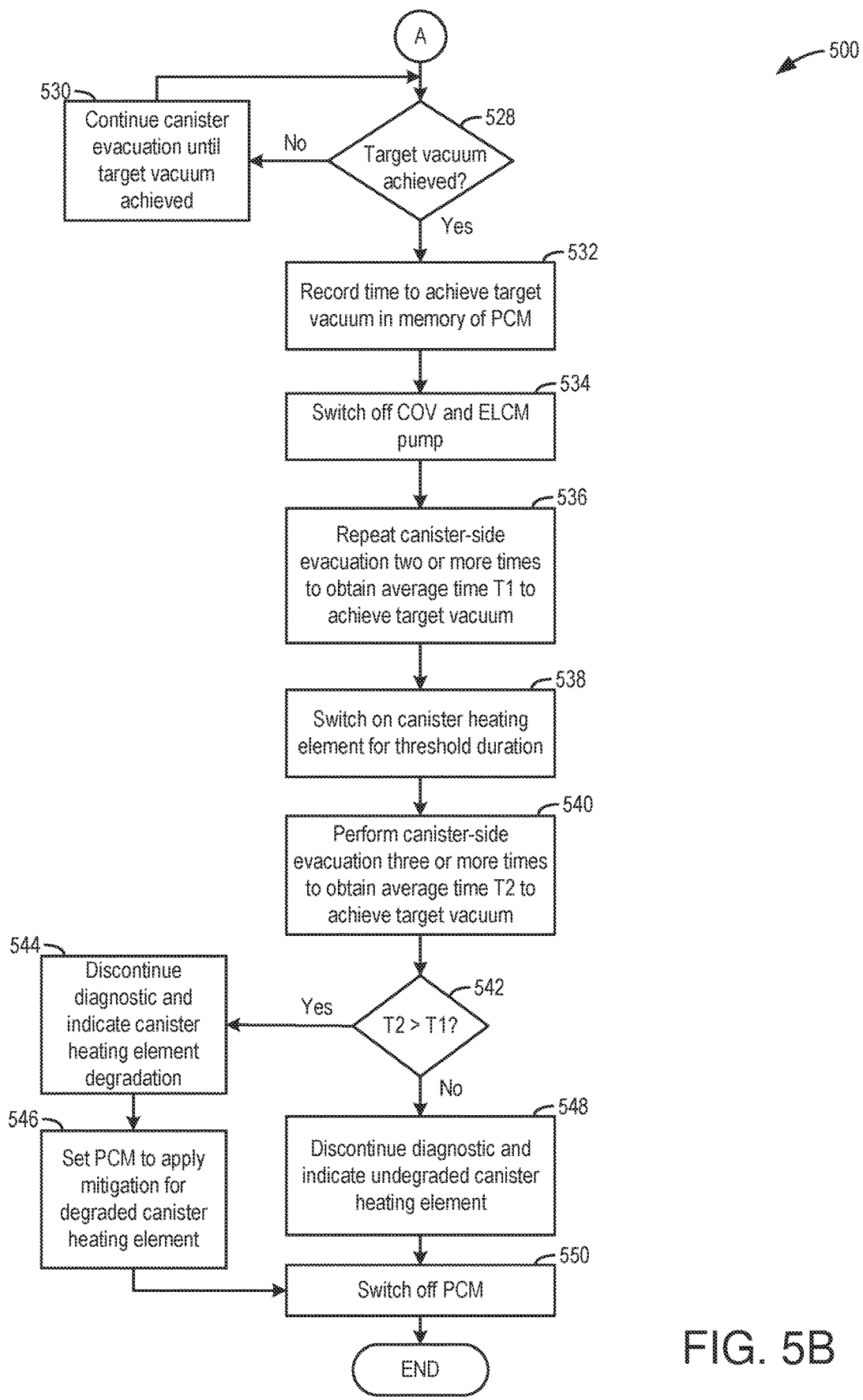
FIG. 5B shows a second part a high level flow chart for a method for diagnosing the integrity of a canister heating element of an EVAP system.
Figure 6:
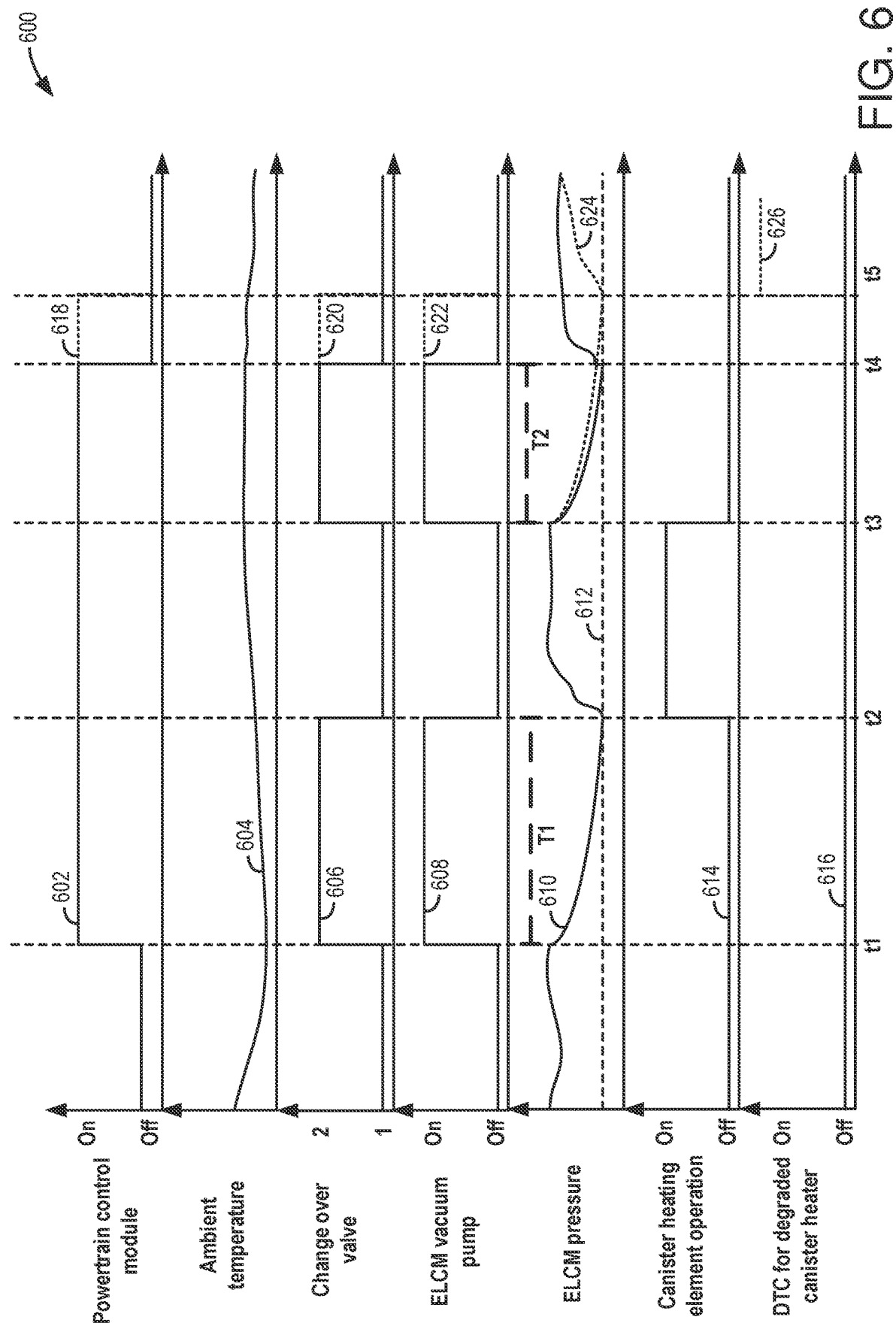
FIG. 6 shows an example diagnostic of the canister heating element during a minimum temperature of a diurnal temperature cycle.

FIGS. 5A and 5B shows a high-level flow chart for an example method 500 for performing a diagnostic for a canister heating element (e.g., 236 of FIG. 2) of a fuel vapor canister (e.g., 222 of FIG. 2) of an EVAP system (e.g., 251 of FIG. 2). Method 500 will be described with relation to the systems depicted in FIGS. 1-3, but it should be understood that similar methods may be used with other systems without departing from the scope of this disclosure. Method 500 may be carried out by controller 212, which may be configured as a powertrain control module (PCM).

At 502, method 500 includes estimating and/or measuring vehicle and engine operating conditions. These include, for example, if the vehicle is propelled via motor torque and/or engine torque, torque demand, manifold pressure, manifold air flow, fuel level in fuel tank, ambient conditions (ambient temperature, pressure, and humidity, for example), engine conditions such as engine speed, engine temperature, engine dilution, etc.

At 504, method 500 includes determining if an engine-off condition is satisfied. An engine-off condition may include the PCM determining that the fuel injection via fuel injectors (such as fuel injectors 266 of FIG. 2) are deactivated, the spark plugs (not shown) are deactivated, and a fuel pump (such as fuel pump 221 of FIG. 2) is switched off. During an engine-off condition, the engine is not rotated by combusting air and fuel in the engine cylinders or by actuation of a motor. If the engine-off condition is not satisfied, then at 506, the method includes continuing to wait until an engine-off condition is met, after which the method may return to 504.

If it is determined that an engine-off condition has occurred, then at 508, method 500 includes determining if the entry conditions for the canister heating element diagnostic are met. The entry conditions for the canister heating element diagnostic may include a passing of an EVAP system (such as EVAP system 251 of FIG. 2) diagnostics test indicating that there are no degradations (such as leaks) in the EVAP system. As an example, a diagnostics routine such as using an evaporative leak check module (ELCM) (such as ELCM 295 of FIGS. 2, 3A-C) may be carried out prior to the onset of method 500 to ascertain the robustness of the EVAP system. The degradation test may determine if there are any degradations in the EVAP system greater than or equal to threshold size (e.g., 0.02"), the threshold size determined by a reference orifice (such as reference orifice 340 of FIGS. 3A-C). If there is a degradation of the EVAP system of a size greater than the reference orifice, the ELCM degradation test may fail. The ELCM degradation test to be conducted as an entry condition for the canister heating element diagnostic may be the one depicted in FIG. 4.

Entry condition for conducting the canister heating element diagnostic may also include the fuel vapor canister being free of adsorbed vapors. In a NIRCOS fuel system (such as fuel system 140 of FIG. 2), diurnal and running loss vapors may not load the canister, and the canister may be loaded during refueling events. Therefore, once the canister is purged from refueling vapors, it may stay unloaded until a subsequent refill event. The level of canister loading may be inferred by an exhaust gas sensors (such as exhaust gas sensor 237 of FIG. 2). For example, during a previous purge event, the loading of the canister may be determined by monitoring the output of the exhaust sensor. In particular, during the purge event, as vapors are being desorbed from the canister, the exhaust gas sensor may initially indicate that the exhaust is rich, and may then gradually switch to indicating that the exhaust is lean as the canister continue to be purged. A threshold level of change in the exhaust gas sensor reading may then indicate that the canister is sufficiently purged, the threshold level depending on one or more of an engine temperature, and an ambient temperature. If any of the entry conditions are not met, at 510, method 500 includes waiting until the entry conditions are met; the method may then end.

If each of the entry conditions are met, then at 512, method 500 includes monitoring ambient temperature conditions for a minima in diurnal temperature cycle. In one example, ambient temperature may be monitored in real-time by an ambient temperature sensor (not shown) coupled to the vehicle. In one example, ambient temperature may be monitored via local weather data as obtained from an external source such as a network cloud via wireless communication. In another example, the local weather data may be forecast weather data retrieved by the PCM from one or more internet web sites (e.g. National Weather Service). The forecast weather information retrieved may pertain to expected ambient temperature changes and weather conditions related to a diurnal cycle. For example, a diurnal cycle temperature variation may include a heat gain portion of the diurnal cycle, and a heat loss portion of the diurnal cycle. The heat gain portion may comprise a portion of the diurnal cycle where ambient temperatures are increasing, whereas the heat loss portion may comprise a portion of the diurnal cycle where ambient temperatures are decreasing. The PCM may further determine an approximate time when temperature corresponding to the heat loss portion is at a minimum, in addition to the predicted temperature minimum. Such information may be stored at the PCM.

At 514, method 500 includes programming a wake-up of the PCM at the time of the upcoming temperature minimum in the diurnal temperature cycle. The time at which the ambient temperature will reach a minimum of the diurnal temperature cycle, as stored in the PCM in 512, may be used as a trigger condition in order to switch the PCM from a low-power state, such as a sleep mode in which most functionalities of the PCM are switched off, to a reduced power state, such as a wakeup mode in which more functionalities are available than in the low-power state, but fewer functionalities are available than in a fully operational power state, such as an active mode (such as when the engine is switched on).

At 516, method 500 includes determining if the ambient temperature has reached a minimum of the diurnal temperature cycle. This may be determined by estimating an ambient temperature via the ambient temperature sensor, and comparing the measured ambient temperature with a value of the predicted temperature minimum of the diurnal temperature cycle, as stored in the memory of the PCM. In one example, the measured value of the ambient temperature may be directly compared with the value of the predicted temperature minimum of the diurnal temperature cycle. In another example, if the ambient temperature is when a threshold of relative difference of the predicted minimum temperature of the diurnal temperature cycle (e.g., within 5%), the ambient temperature may be determined to be equal to the temperature minimum of the diurnal temperature cycle, or in other words, may be determined to have reached the minimum of the diurnal temperature cycle. If the ambient temperature is not determined to have reached the minimum of the diurnal temperature cycle, then at 518, method 500 includes maintaining current vehicle operating conditions until temperature minimum of diurnal cycle is achieved; method 500 may then return to 516.

If it is determined that the ambient temperature has reached the minimum temperature of the diurnal temperature cycle, then at 520, method 500 includes reactivating the PCM. Reactivation of the PCM may include switching the PCM from a sleep mode to a wake-up mode, which may allow for actuation of the canister heating element and valves, such as the canister heating element, a changeover valve (COV) (e.g., 296 of FIGS. 2, 3A-C), a fuel tank isolation valve (FTIV) (e.g., 252 of FIG. 2), a tank pressure control valve (TPCV) (e.g., 218 of FIG. 2).

At 522, method 500 includes maintaining closed each of the TPCV and the FTIV, which may be normally closed valves as part of the NIRCOS fuel system. The method may also include activating the COV. Activating the COV may include actuating it from a first position to a second position (such as the second position of the COV as depicted in FIG. 3B). Actuating the COV from the first position to the second positon may fluidly couple the canister via a vent line (e.g., vent line 227 of FIG. 2) and the atmosphere, via a second flow path (e.g., 325 of FIGS. 3A-C).

At 524, method 500 includes switching on a vacuum pump (e.g., 330 of FIGS. 3A-C) of the ELCM. The vacuum pump may be activated, such that air is pumped from the canister, which is fluidly coupled to the ELCM via the vent line, through the second flow path. A timer may be set at the time of activation of the pump. With the vacuum pump switched on, at 526, method 500 includes evacuating the canister via the vacuum pump. Due to the canister already having been unloaded in 508, the vacuum generated via the vacuum pump may route air from the canister, through the second flow path and the vacuum pump, and out to atmosphere, with minimal to no hydrocarbons included therein.

The air may then continue to be evacuated from the canister, until the level of vacuum reaches a threshold level of vacuum.

At 528, method 500 includes determining if the target vacuum level of the ELCM is achieved. In one example, the target vacuum level may be a target that is determined during the reference check from the degradation test conducted as part of the entry conditions of 508. In another example, the target vacuum level may be determined using a look-up table based on ambient pressure and temperature conditions; the look-up table including pre-calibrated values of target vacuum levels corresponding to a plurality of ambient pressure and temperature conditions. For example, the target vacuum level may typically be around −11 In. $H_2O$ at sea level. The pressure of the ELCM may then be measured by a pressure sensor (e.g., 297 of FIGS. 2, 3A-C), in order to compare the pressure in the ELCM to the target vacuum level. If the target vacuum level is not achieved, then at 530, the method may continue to evacuate the canister until the target vacuum level is achieved. If the target vacuum level is achieved, then at 532, method 500 includes recording the time taken, from the time the vacuum pump is switched on, in order to achieve the target level of vacuum. In one example, during a cold weather condition (when the canister is cold) it may take between 40-50 seconds to achieve the target level of vacuum. The time taken to achieve the target level of vacuum may be stored in the non-transitory memory of the PCM.

Following recording the time taken to achieve the target vacuum level in the non-transitory memory of the PCM, at 534, method 500 includes switching off the COV (e.g., actuating the COV from the second position to the first position), thereby coupling the canister side through the vent line to the atmosphere via a first flow path (e.g., 320 of FIGS. 3A-C) which may bypass the vacuum pump, as depicted in FIG. 3C. Further, the method includes switching off the ELCM vacuum pump. By switching off the vacuum pump, a pressure gradient between the canister side of the ELCM and the atmosphere may equilibrate to atmospheric pressure, and the air may no longer be drawn out of the canister via a vacuum generated by the vacuum pump.

At 536, method 500 may include repeating the canister-side evacuation (in other words, steps 522-534 of method 500) two or more times in order to obtain an average value of the time taken to achieve the target vacuum level. In one example, the canister-side evacuation may be repeated three times, after which the four times taken to achieve the target vacuum level may be averaged to obtain an average time T1 to achieve the target vacuum level, which may be stored in the non-transitory memory of the PCM. By taking an average of three or more measurements of the time taken to achieve the target vacuum level, unsystematic noise in the canister-side evacuation process (e.g., small fluctuations in the atmospheric pressure during the evacuation process) may be reduced.

At 538, method 500 includes switching on the canister heating element for a threshold duration. The threshold duration may be pre-calibrated based on a geometry of the canister and the characteristics of the canister heating element, such as power output of the canister heating element, in order to heat the canister to a desired temperature, and may also be dependent on the ambient temperature, as determined in 516. In one example, the desired temperature may reach 110° C. The desired temperature may be a temperature at which the air contained within the canister may have a reduced density, which may allow for easier evacuation of the air from the canister upon a subsequent evacuation of the canister via the ELCM vacuum pump. In other examples, in which there is a temperature sensor coupled to the fuel vapor canister, the canister heating element may be switched on until the canister reaches a threshold temperature, as measured by the temperature sensor.

At 540, method 500 includes performing the canister-side evacuation, in order to obtain an average time T2 to achieve the target vacuum level of the ELCM, as measured by the pressure sensor included therein. As part of the canister-side evacuation, the COV may again be actuated from the first position to the second position, the FTIV and the TPCV may continue to be maintained closed, the ELCM vacuum pump may be switched on, and the vacuum pump may remain switched on until the pressure within the ELCM reaches the target vacuum level, as estimated by the pressure sensor. Upon achieving the target vacuum level, a time taken to reach the target vacuum level after the vacuum pump is switched on may be recorded in the non-transitory memory of the PCM. Subsequently, the COV may be actuated from the second position to the first position, and the ELCM pump may be switched off. The canister-side evacuation may then be repeated two or more times in order to obtain an average value for T2. The canister may be again heated prior to performing the canister-side evacuation, in order to maintain a level of heating of the canister. In other examples, the time to achieve the target level vacuum T2 may be obtained from a single measurement during the canister-side evacuation. In yet other examples, the canister heating and subsequent canister-side evacuation may be repeated up to the same number of times taken in order to obtain T1, with the maximum number of repeats dependent on a measured state of charge (SOC) of an energy storage device (such as energy storage device 150 of FIG. 1).

Upon obtaining an average value T2 for the time taken to achieve the target level of vacuum during a canister-side evacuation under heated conditions, at 542, method 500 includes determining if T1 is greater than T2. If T1 is greater than T2, it may be inferred that the canister heating element is functioning without degradation, as the pump was able to generate the target level of vacuum more quickly in the case where the canister heating element was commanded on versus in the cold weather condition. Due to the canister heating element, the air may be less dense than in the cold weather condition, leading to the vacuum pump pumping the lighter, heated air more quickly than in the cold weather condition, therefore leading to the time to achieve the target vacuum level being less in the heated condition than in the cold weather condition. In one example, T1 may be compared directly to T2. In another example, if T1 is greater than T2 beyond a threshold of relative difference of T1 (e.g., beyond 20%), then T2 may be determined to sufficiently less than T1. Otherwise, if T2 is within the threshold of relative difference of T1, it may be said that T2 is not sufficiently less than T1, and may be an indication that the canister heating element is degraded.

In some examples, following obtaining the average value T2, the heater may be switched off, the canister may be allowed to cool down for another threshold duration, the other threshold duration set by the ambient temperature, as determined in 516. The canister-side evacuation may then be performed again, the canister-side evacuation including actuating the COV from the first position to the second position, maintaining the FTIV and the TPCV closed, and switching on the ELCM vacuum pump until the target vacuum level of the ELCM is achieved, as determined by the pressure sensor. Following reaching the target vacuum level of the ELCM, the time taken to reach the target vacuum level may be recorded. Subsequently, the COV may be actuated from the second position to the first position, and the ELCM pump may be switched off. The canister-side evacuation and subsequent recording of the time taken to reach the target vacuum level may then be repeated two or more times in order to obtain an average time T3, which may be used in order to determine if a canister-side degradation has occurred, as explained below.

If, at 542, it is determined that T2 is not sufficiently less than T1, then it may be inferred that the canister heating element is degraded, and at 544, method 500 includes discontinuing the canister heating element diagnostic, and indicating the canister heating element is degraded. Indication of degradation of the canister heating element may be indicated to the vehicle operator via a DTC.

At 546, method 500 includes setting the PCM to apply mitigation for the degraded canister heating element during vehicle operation. Mitigation for the degraded canister heating element may include increased purge frequency of the canister following each loading event (such as during refueling and/or pressure release from the fuel tank).

Following setting the PCM to apply mitigation for the degraded canister heating element during vehicle operation, at 550, method 500 includes switching off the PCM, or in other words, returning the PCM to the sleep power mode from the wakeup power mode. Following 550, method 500 may end.

Returning to 542, if it is determined that T2 is sufficiently less than T1, at 548, method 500 may include discontinuing the canister heating element diagnostic, and indicating that the canister heating element is not degraded in the non-transitory memory of the PCM. In the examples in which T2 is sufficiently less than T1 and T3 is obtained, then at 548, method 500 may additionally include comparing T3 to T2. If T2 is sufficiently less than T3, then no further actions may follow. However, if T2 is not sufficiently less than T3, e.g., T3 being within the threshold relative difference of T2, then it may be inferred that there is a canister-side degradation. In such examples, the method may further include indicating that there is a canister-side degradation in the non-transitory memory of the PCM, and a DTC may be set. Further, in some examples, in order to mitigate the canister-side degradation, canister purging may be disabled until the degradation is serviced, and the DTC is cleared. Method 500 may then proceed to 550 to switch off the PCM, and then the method may end.

In this way, the ELCM may be used to diagnose the canister heating element under a first condition, whereby the canister is at the temperature minimum of a diurnal temperature cycle, isolated, evacuated via the ELCM pump, and a first time (T1) to evacuate the canister is recorded by the PCM, and under a second condition, whereby the canister is heated for a threshold duration, isolated, evacuated via the ELCM pump, and a second time (T2) to evacuate the canister is recorded by the PCM. A state of degradation of the canister heating element may then be indicated by comparing T1 and T2. In particular, degradation of the canister heating element may be indicated in response to T2 being substantially equal to T1. By comparing the time to evacuate the canister under heated and cold weather conditions, a simple and robust diagnostic for the canister heating element may be realized.

Turning now to FIG. 6, example timeline 600 depicts an example diagnostic of a canister heating element (e.g., 236 of FIG. 2) of fuel vapor canister (e.g., 222 of FIG. 2) of an EVAP system (e.g., 251 of FIG. 2) of an engine system (e.g., 208 of FIG. 2). The horizontal (x-axis) denotes times and the vertical markers t1-t5 identify significant points during the canister heating element diagnostic.

The example timeline 600 depicts operation of operation of a vacuum pump (e.g., 330 of FIGS. 3A-C) of an ELCM (e.g., 295 of FIGS. 2, 3A-C), as part of a diagnostic for the canister heating element. The first plot, plot 602, shows operation of a PCM. The second plot, plot 604, shows an ambient temperature, which may be monitored for a minimum of a diurnal temperature cycle, in order to initiate the canister heating element diagnostic. The third plot, plot 606, shows operation of a COV (e.g., 296 of FIGS. 2, 3A-C) of the ELCM, which is operable in a first position and a second position. The fourth plot, plot 608, shows operation of the ELCM pump, which generates vacuum within the ELCM, as measured by a pressure sensor (e.g., 297 of FIGS. 2, 3A-C). The fifth plot, plot 610, shows the pressure inside the ELCM. The pressure in the ELCM is monitored and compared to a target vacuum level. The target vacuum level is illustrated by dashed line 612. The sixth plot, plot 614, shows operation of the canister heating element. The seventh plot, plot 616, shows indication of a DTC for a degraded canister heating element. The time taken to evacuate the canister to the target vacuum level during the temperature minimum is compared to the time taken to evacuate the canister to the target vacuum level under heated conditions. If the time taken to reach the target vacuum level in the heated condition is not sufficiently less than the time taken to reach the target vacuum level during the temperature minimum, it is determined that the canister heating element is degraded, and the DTC sets.

The above plots may deviate when the canister heating element is degraded versus when it is not degraded. Plot 618 illustrates operation of the PCM in a case of a degraded canister heating element. Similarly, plot 620 illustrates operation of the COV, plot 622 operation of the ELCM vacuum pump, plot 624 illustrates the pressure in the ELCM, and plot 626 illustrates indication of the DTC for a degraded canister heating element, each in an example case of a degraded canister heating element.

Prior to time t1, the engine is in an off state, and consequently the PCM is operating in a sleep power mode. The entry conditions of the EVAP system determined to be free of degradations, and the canister being unloaded, have been satisfied. The COV is in a first position, the ECM vacuum pump is switched off, the pressure in the ELCM is near atmospheric pressure, the canister heating element is switched off, and the DTC indicating a degraded canister heating element is in an off state. The ambient temperature is being monitored for a temperature minimum in the diurnal temperature cycle, and the PCM is programmed to wake up at the time at which the diurnal temperature cycle reaches the temperature minimum.

The ambient temperature drops, as part of the heat loss portion of the ambient temperature cycle. At t1, the ambient temperature reaches the temperature minimum of the diurnal temperature cycle. In response to the ambient temperature reaching the temperature minimum of the diurnal temperature cycle, the PCM is commanded from the sleep power mode to the wakeup power mode, in order to begin the canister heating element diagnostic. As part of the diagnostic, the PCM maintains the FTIV and the TPCV in their respective closed positions, and actuates the COV from the first position to the second position, so that air flows between a canister side of the ELCM and the atmosphere side of the ELCM through the ELCM pump. Following actuation of the COV from the first position to the second position, the PCM actuates the ELCM pump from an off position to an on position, routing air from the canister side of the ELCM to the atmosphere side of the ELCM, thereby evacuating the fuel vapor canister. Consequently, from t1 to t2, as the canister is being evacuated, the ELCM pressure, as estimated by the pressure sensor, drops.

At t2, the ELCM pressure drops to the target vacuum level, the target vacuum level determined during the entry condition EVAP degradation test via a reference check of the ELCM. The time T1 taken to reach the target vacuum level in the ELCM is then recorded in the non-transitory memory of the PCM. While the example timeline 600 only shows one cycle of canister evacuation in cold weather conditions, the evacuation can be repeated two or more times, in order to obtain an average value T1 of the time taken to reach the target vacuum level in the ELCM. In response to the recording of T1 in the non-transitory memory of the PCM, the PCM actuates the COV from the second position to the first position, switches the ELCM pump from an on position to an off position, and switches the canister heating element from an off position to an on position, in order to heat the canister to a desired temperature.

From t2 to t3, the canister is continually heated by the canister heating element for a threshold duration in order to heat the canister to the desired temperature. Concomitantly, in response to the ELCM pump being switched off, the pressure in the ELCM increases and equilibrates with atmospheric pressure.

At t3, the threshold duration of heating is reached. In response, the PCM actuates the canister heating element from an on position to an off position, in order to begin the canister evacuation under heated conditions. Concomitantly, as part of beginning the canister evacuation, the PCM actuates the COV from the first position to the second position, and actuates the ELCM pump from an off position to an on position, routing the heated air from the canister through the canister side of the ELCM, through the ELCM pump, and out to the atmospheric side of the ELCM. From t3 to t4, the ELCM pump continues to evacuate the heated air from the canister.

At t4, the pressure in the ELCM, as estimated by the pressure sensor, reaches the target level of vacuum. The time T2 taken to reach the target vacuum level in the ELCM under heated conditions is then recorded in the non-transitory memory of the PCM. While the example timeline 600 only shows one cycle of canister evacuation under heated conditions, the evacuation can be repeated two or more times, in order to obtain an average value T2 of the time taken to reach the target vacuum level in the ELCM. In response to the recording of T2 in the non-transitory memory of the PCM, the PCM actuates the COV from the second position to the first position, and switches the ELCM pump from an on position to an off position. At time t4, the values of T1 and T2 are compared by the PCM, and it is found that T2 is sufficiently less than T1. In response, an un-degraded state of the canister in recorded in the non-transitory memory of the PCM, and the DTC is maintained in the off state. Consequently, the PCM is switched off, and the diagnostic ends.

In an alternate example, if it takes from t3-t5 for the ELCM pressure to drop to the target level of vacuum, then at t5, the time T2 taken to reach the target vacuum level in the ELCM under heated conditions would then recorded in the non-transitory memory of the PCM. In response to the recording of T2 in the non-transitory memory of the PCM, the PCM would then actuate the COV from the second position to the first position, and switch the ELCM pump from an on position to an off position. The PCM would then compare T1 and T2, T2 would not be sufficiently less than T1, and it would be inferred that the canister heating element is degraded, In response to not being sufficiently less than T1, a degraded state of the canister would be recorded in the non-transitory memory of the PCM, and the DTC would be actuated from an off state to an on state by the PCM. Consequently, the PCM would be switched off, and the diagnostic would end.

In this way, by diagnosing the integrity of a canister by evacuating a clean canister under a first, cold weather condition, and a second, heated condition, a simplified diagnostic for the canister heating element may be achieved. By comparing the time taken to evacuate the canister under the cold weather condition and the time to evacuate the canister under the heated condition, further hardware, such as a hydrocarbon sensor coupled to the EVAP system and/or a temperature sensor coupled to the canister, may not be included, reducing system complexity. The technical effect of initiating the diagnostic during a temperature minimum in the diurnal temperature cycle is that the canister may be diagnosed in a noise-free domain, where extraneous sources of heat, such as engine and catalyst heat, may not confound the results. Further, by having the entry conditions of an un-degraded EVAP system and a clean canister, the method may pull a vacuum on the canister without the possibility of routing emissions from the canister to the atmosphere.

The disclosure provides support for a method for an engine, comprising: diagnosing a heating element coupled to a canister of an evaporative emissions control (EVAP) system based on a time to evacuate the canister at different temperature conditions. In a first example of the method, the different temperature conditions include a first temperature corresponding to a minimum temperature of a diurnal temperature cycle, and a second temperature attained in the canister upon operating the heating element for a threshold duration. In a second example of the method, optionally including the first example, the diagnostics of the heating element is initiated upon each of a confirmation of absence of degradation of the EVAP system, and a lower than threshold fuel vapor load in the canister, the confirmation of absence of degradation based on another diagnostic routine of the EVAP system being carried out via an evaporative leak control module (ELCM). In a third example of the method, optionally including one or both of the first and second examples, the method further comprises: following the each of the confirmation of absence of degradation of the EVAP system and the lower than threshold fuel vapor load in the canister, monitoring an ambient temperature via an ambient temperature sensor, and switching on a powertrain control module (PCM) in response to an ambient temperature reaching the first temperature. In a fourth example of the method, optionally including one or more or each of the first through third examples, the diagnostics of the heating element includes, at the first temperature, maintaining closed each of a fuel tank isolation valve (FTIV) and a tank pressure control valve (TPCV) of a fuel tank, actuating a changeover valve (COV) of the ELCM from a first position to a second position, and switching on a vacuum pump of the ELCM to evacuate the canister. In a fifth example of the method, optionally including one or more or each of the first through fourth examples, the evacuation of the canister is continued until a pressure in the ELCM reaches a target vacuum level, as measured by a pressure sensor of the ELCM, and in response to the pressure in the ELCM reaching the target vacuum level, switching off the vacuum pump, actuating the COV from the second position to the first position, and estimating a first time duration taken to evacuate the canister. In a sixth example of the method, optionally including one or more or each of the first through fifth examples, the method further comprises: repeating the evacuation of the canister two or more times at the first temperature and recording time durations taken to evacuate the canister for each of the two or more evacuations of the canister at the first temperature, and estimating a first average time duration based on the time durations taken to evacuate the canister for each of three or more evacuations of the canister at the first temperature. In a seventh example of the method, optionally including one or more or each of the first through sixth examples, the method further comprises: following calculation of the first average time duration, switching on the heating element for the threshold duration until the second temperature of the canister is attained. In an eighth example of the method, optionally including one or more or each of the first through seventh examples, the method further comprises: upon the threshold duration elapsing, evacuating the canister three or more times at the second temperature, recording time durations taken to evacuate the canister for each of the three or more evacuations of the canister at the second temperature, and estimating a second average time duration based on the time durations taken to evacuate the canister for each of the three or more evacuations of the canister at the second temperature. In a ninth example of the method, optionally including one or more or each of the first through eighth examples, the method further comprises: comparing the second average time duration to the first average time duration, and in response to the second average time duration being greater than or equal to the first average time duration, indicating the heating element to be degraded. In a tenth example of the method, optionally including one or more or each of the first through ninth examples, the method further comprises: in response to the indication of degradation of the heating element, increasing a frequency of purging of the canister following subsequent canister loading events. In a eleventh example of the method, optionally including one or more or each of the first through tenth examples, the method further comprises: in response to the second average time duration being less than the first average time duration, indicating the heating element as not degraded.

The disclosure also provides support for a method for an engine, comprising: during a first condition, isolating a canister of an evaporative emissions control (EVAP) system, evacuating the canister, and recording a first time taken to evacuate the canister, during a second condition, isolating the canister, evacuating the canister, and recording a second time taken to evacuate the canister, and indicating a heating element coupled to the canister to be degraded based on the first time and the second time. In a first example of the method, the first condition includes a minimum ambient temperature of a diurnal temperature cycle during an engine-off condition, and a confirmation that the EVAP system is not degraded and a fuel vapor loading of the canister is lower than a threshold load. In a second example of the method, optionally including the first example, the second condition includes a heated canister upon completion of the recording of the first time taken to evacuate the canister during the first condition, the canister heated via operation of the heating element for a threshold duration following the recording of the first time taken to evacuate the canister. In a third example of the method, optionally including one or both of the first and second examples, the heating element is indicated to be degraded is in response to the second time being substantially equal to the first time.

The disclosure also provides support for a system for an engine, comprising: a controller storing instructions in non-transitory memory that, when executed, cause the controller to: at a minimum diurnal temperature, upon conditions being met for diagnostics of a heating element coupled to a canister of an evaporative emissions control (EVAP) system, record a first time taken to evacuate the canister, activate the heating element to heat the canister, record a second time taken to evacuate the heated canister, indicate the heating element to be degraded in response to the first time being substantially equal to the second time. In a first example of the system, the conditions for diagnostics of the heating element include each of an engine-off event, a passing result of an EVAP degradation test initiated by an evaporative leak control module (ELCM) during the engine-off event, and a loading in the canister being below a threshold level. In a second example of the system, optionally including the first example, the evacuating the canister includes maintaining each of a fuel tank isolation valve (FTIV) and a tank pressure control valve (TPCV) of a fuel tank closed, actuating a changeover valve (COV) of the ELCM from a first position to a second position, and operating a vacuum pump of the ELCM until a threshold level of vacuum is attained in the canister. In a third example of the system, optionally including one or both of the first and second examples, the heating element is maintained active to heat the canister for a threshold duration, the threshold duration being a pre-calibrated duration based on the minimum diurnal temperature, a power output of the heating element, and a geometry of the canister.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
evacuating a canister of an evaporative emissions control (EVAP) system; and
diagnosing a heating element coupled to the canister of the EVAP system based on a time to evacuate the canister at different temperature conditions.

2. The method of claim 1, wherein the different temperature conditions include a first temperature corresponding to a minimum temperature of a diurnal temperature cycle, and a second temperature attained in the canister upon operating the heating element for a threshold duration.

3. The method of claim 2, wherein the diagnosing of the heating element is initiated upon each of a confirmation of absence of degradation of the EVAP system, and a lower than threshold fuel vapor load in the canister, the confirmation of absence of degradation based on another diagnostic routine of the EVAP system being carried out via an evaporative leak control module (ELCM).

4. The method of claim 3, further comprising, following each of the confirmation of absence of degradation of the EVAP system and the lower than threshold fuel vapor load in the canister, monitoring an ambient temperature via an ambient temperature sensor, and switching on a powertrain control module (PCM) in response to the ambient temperature reaching the first temperature.

5. The method of claim 4, wherein the diagnosing the heating element includes, at the first temperature, maintaining closed each of a fuel tank isolation valve (FTIV) and a tank pressure control valve (TPCV) of a fuel tank, actuating a changeover valve (COV) of the ELCM from a first position to a second position, and switching on a vacuum pump of the ELCM to evacuate the canister.

6. The method of claim 5, wherein evacuation of the canister is continued until a pressure in the ELCM reaches a target vacuum level, as measured by a pressure sensor of the ELCM, and in response to the pressure in the ELCM reaching the target vacuum level, switching off the vacuum pump, actuating the COV from the second position to the first position, and estimating a first time duration taken to evacuate the canister.

7. The method of claim 6, further comprising repeating evacuation of the canister two or more times at the first temperature and recording time durations taken to evacuate the canister each time the canister is evacuated at the first temperature, and estimating a first average time duration based on the time durations taken to evacuate the canister for each of three or more evacuations of the canister at the first temperature.

8. The method of claim 7, further comprising, following the estimating of the first average time duration, switching on the heating element for the threshold duration until the second temperature of the canister is attained.

9. The method of claim 8, further comprising, upon the threshold duration elapsing, evacuating the canister three or more times at the second temperature, recording time durations taken to evacuate the canister for each of the three or more evacuations of the canister at the second temperature, and estimating a second average time duration based on the time durations taken to evacuate the canister for each of the three or more evacuations of the canister at the second temperature.

10. The method of claim 9, further comprising comparing the second average time duration to the first average time duration, and in response to the second average time duration being greater than or equal to the first average time duration, indicating the heating element to be degraded.

11. The method of claim 10, further comprising, in response to indicating degradation of the heating element, increasing a frequency of purging of the canister following subsequent canister loading events.

12. The method of claim 11, further comprising, in response to the second average time duration being less than the first average time duration, indicating the heating element as not degraded.

13. A method for an engine, comprising:
   evacuating a canister of an evaporative emissions control (EVAP) system; and
   diagnosing a heating element coupled to the canister of the EVAP system based on a time to evacuate the canister at different temperature conditions, wherein diagnosing the heating element includes evacuating a carbon filled canister of gases a first plurality of times while the heating element is deactivated.

14. The method of claim 13, wherein diagnosing the heating element includes evacuating the carbon filled canister of gases a second plurality of times while the heating element is activated.

15. The method of claim 13, further comprising inhibiting diagnosing the heating element in response to an indication of degradation of the EVAP system.

16. The method of claim 15, wherein diagnosing the heating element includes diagnosing the heating element when the engine is off.

17. A system for an engine, comprising:
   a controller storing instructions in non-transitory memory that, when executed, cause the controller to:
      evacuate a canister of an evaporative emissions control (EVAP) system; and
      diagnose a heating element coupled to the canister of the EVAP system based on a time to evacuate the canister at different temperature conditions.

18. The system of claim 17, further comprising additional instructions that when executed cause the controller to indicate a presence or absence of degradation of the heating element.

19. The system of claim 18, further comprising additional instructions that when executed cause the controller to increase a frequency of purging the EVAP system of fuel vapors in response to an indication of heating element degradation.

20. The system of claim 17, wherein the heating element is diagnosed via switching the heating element on for a threshold duration.

* * * * *